Aug. 22, 1950 — C. L. NOELCKE, SR — 2,519,923
PARACHUTE PACK
Filed Oct. 9, 1946 — 3 Sheets-Sheet 1
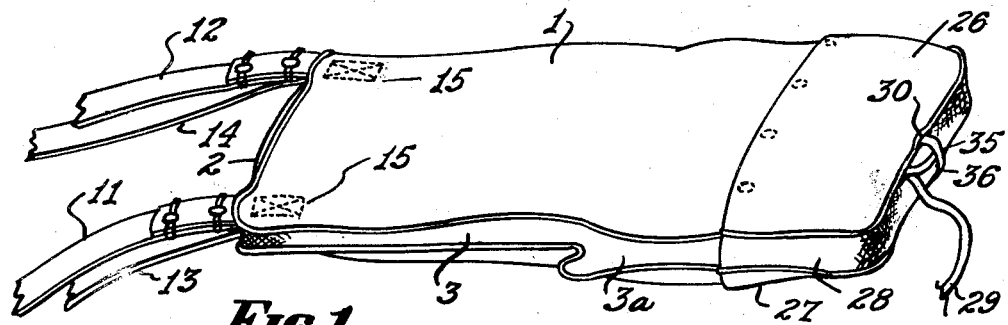
Fig. 1.
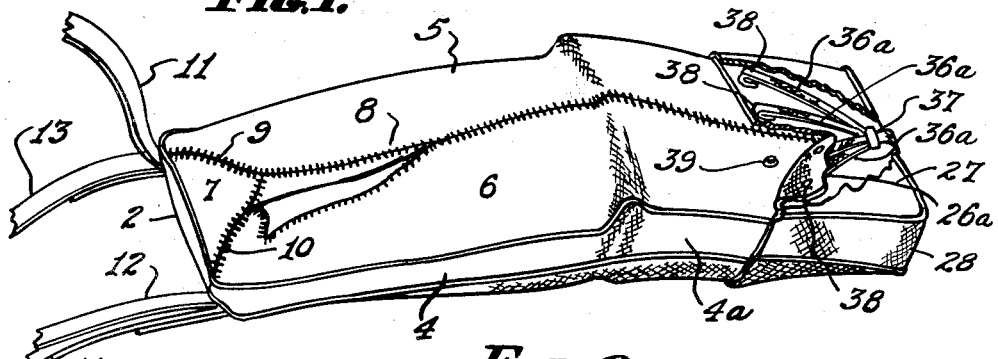
Fig. 2.
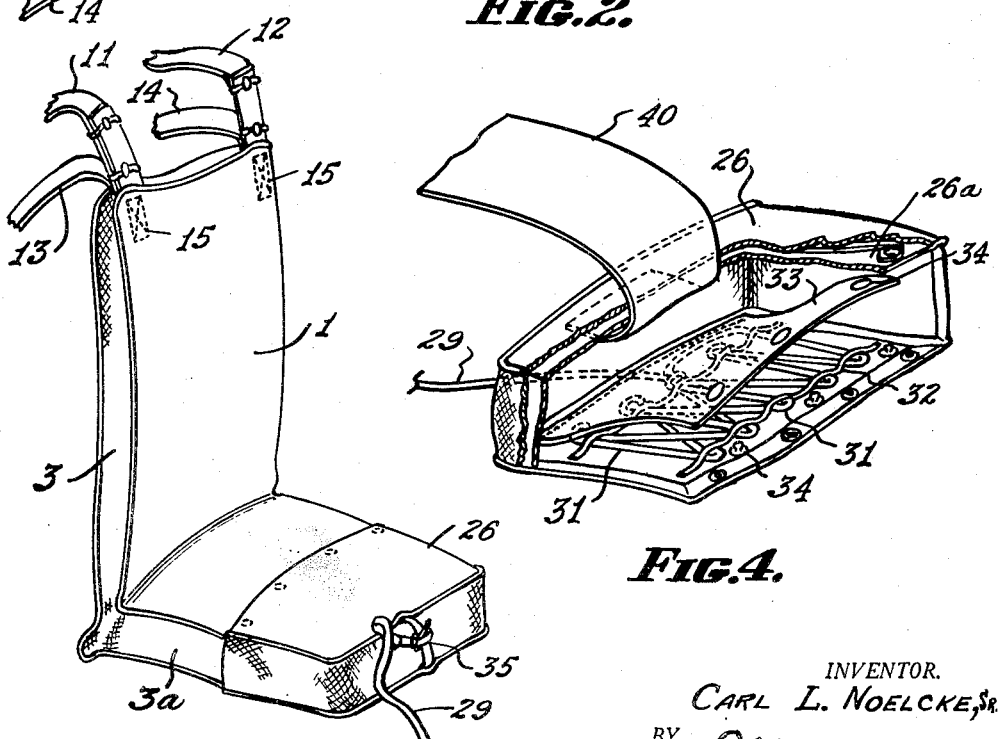
Fig. 3.
Fig. 4.
INVENTOR.
CARL L. NOELCKE, SR.
BY Allen & Allen
ATTORNEYS.

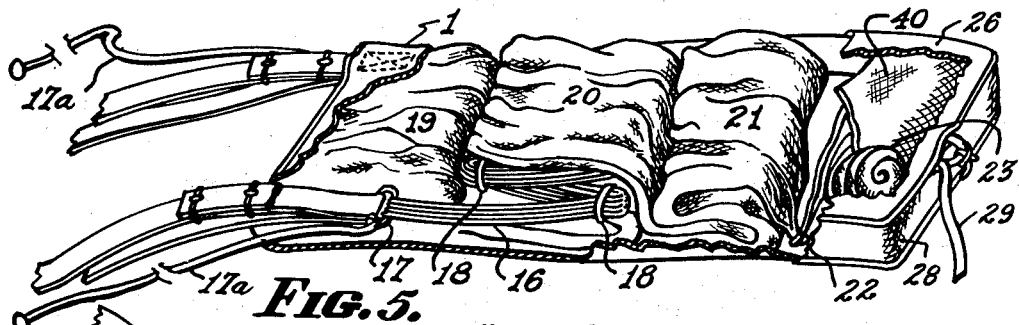
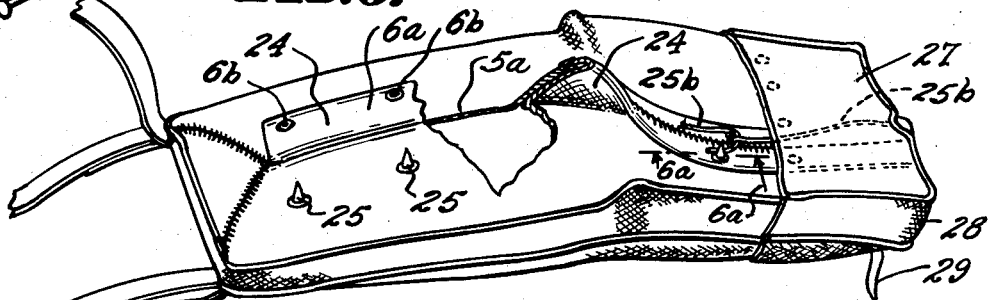
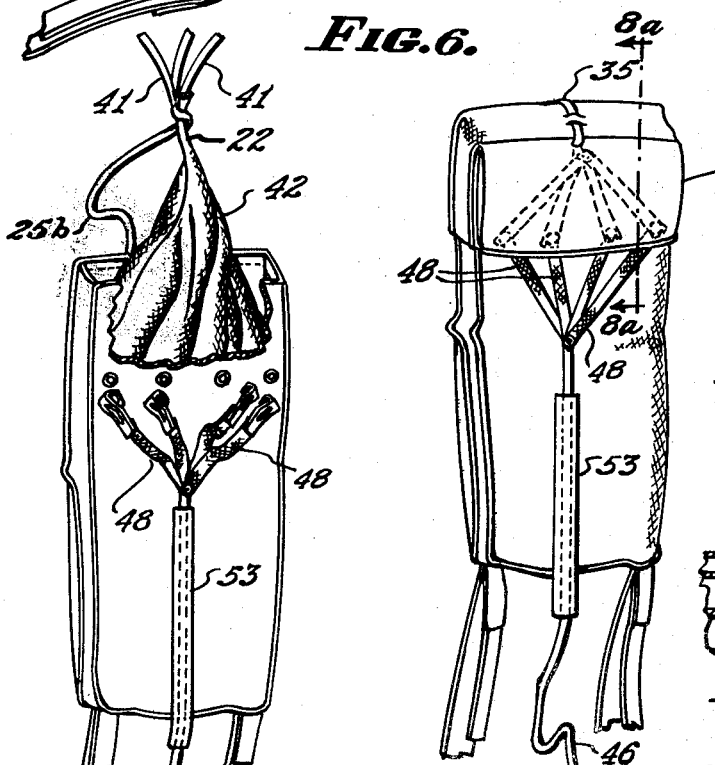
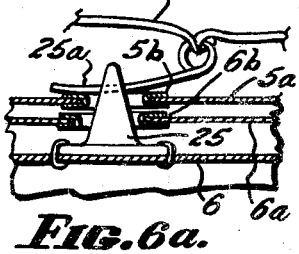

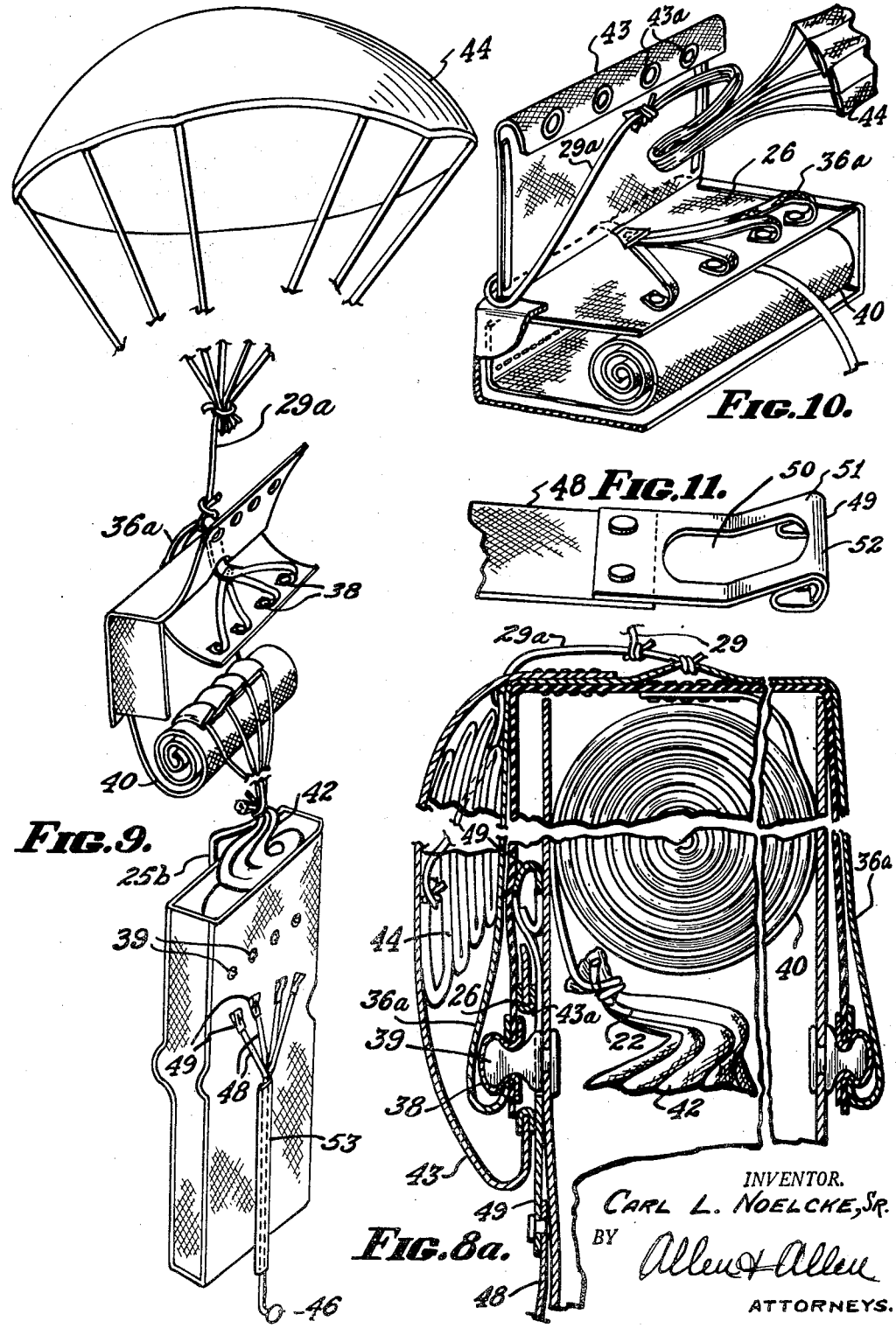

Patented Aug. 22, 1950

2,519,923

UNITED STATES PATENT OFFICE 2,519,923

PARACHUTE PACK

Carl L. Noelcke, Sr., Cincinnati, Ohio

Application October 9, 1946, Serial No. 702,338

19 Claims. (Cl. 244—148)

My invention relates to parachutes of novel and improved construction, and has among its principal objects the provision of a structure having the following advantages over structures known in the art:

My parachute is of a type fitting on the back of the wearer when not in use, and furnishing both a cushioned seat portion and a cushioned back-rest.

My parachute is of soft-pack construction which not only prolongs the life of the structure and simplifies maintenance but also provides softness so that, when used in the seat of an aeroplane no other cushions need be provided.

My parachute is comfortable to wear and therefore is less likely to be detached from the person of the wearer.

The pack construction is such that it tends to control the initial fall of the jumper prior to the time the parachute opens, by minimizing or preventing tumbling as hereinafter explained, so as very greatly to lessen the chance of fouling.

My parachute pack acts in such manner in the air stream as to assume a proper position for the release of the parachute prior to such release, and to remove the point of release as far as possible from the person of the wearer, so as again to prevent fouling and injury to the wearer from paracute parts or appurtenances.

The discharge of my parachute is so controlled as to permit substantially full extension of the parachute proper prior to its inflation by the air stream.

The objects of my invention include the provision of structures in which the aforesaid operational advantages may be obtained, as well as the solution of mechanical problems in connection therewith.

These and other objects of my invention which will be set forth later in these specifications or will be clear to those skilled in the art in the light of my teachings, I accomplish by that construction and arrangement of parts of which I shall now describe certain exemplary embodiments. Reference is made to the accompanying drawings wherein:

Figure 1 is a perspective view of my assembled parachute pack showing the side worn next the person of the user.

Figure 2 is a similar perspective showing the other side of the pack.

Figure 3 shows the pack as it is disposed when the user is seated.

Figure 4 is a perspective view, with parts cut away, of a hood or cap for covering the end of my casing.

Figure 5 is a perspective view with parts cut away showing the disposition of the parachute in the casing.

Figure 6 is a perspective view of an alternative form of the casing.

Figure 6a is a fragmentary cross sectional view through one of the members 25 of Figure 6.

Figure 7 shows the disposition of the casing as the parachute begins to emerge therefrom.

Figure 8 shows my pack with one form of ripcord arrangement.

Figure 8a is a fragmentary cross sectional view taken on the line 8a—8a of Figure 8.

Figure 9 is a perspective view showing an arrangement for parachute release including pilot-chute devices.

Figure 10 shows an arrangement of cap or hood for release of a removal chute.

Figure 11 is a perspective detail of a fastening release device.

My parachute pack assembly is usable with any desired parachute harness, to which it will be attached in suitable manner, for which reason I have not shown a harness herein.

The parachute itself may be any recognized form of parachute usable in the art. I have illustrated no particular style, excepting that it comprises an inflatable fabric body to which cords are attached, the cords being in turn fastened in groups to parachute straps (usually four in number) to permit control of the parachute during descent, as is well understood in this art. The parachute straps are used to fasten the structure to the harness on the person of the user.

Briefly in the practice of my invention I fold and enclose the parachute in an elongated casing, closed at one end except for means for the passage of the straps. This elongated casing is such as to extend approximately from the shoulders to the knees of the user so as to form, when the user is seated, both a back rest and a seat portion. The parachute is soft-packed in the casing, which not only preserves the parachute (since crimping under heavy pressure is avoided) but simplifies parachute maintenance since repacking of unused parachutes is required less often. Also the soft-pack supplies sufficient cushioning to render padding or sponge-rubber cushions needless, though they may be employed if desired.

The pack is sufficiently flexible to hang straight when the user is standing and to bend when the user is sitting, and the case is constructed so as to bend without pinching. The casing is preferably constructed of water-proof material and protects the parachute from rain, moisture, dust and dirt. The open end of the casing is protected by a hood which slips over the end.

When the user of my parachute jumps, the pack, being attached by means of the straps to the harness at or near the shoulders of the user, is caught by the air stream and assumes a position above the user. In this position it acts as a tail, serving not only to keep the user falling below it, but also to prevent tumbling and twisting during initial descent. Thus, prior to the opening of the parachute, the user tends to assume a falling position feet first, with the pack located hood end up and above the user's head. This eliminates fouling, removes the pack as far as possible from the person of the user, and positions the pack properly for the release of the parachute.

The hood is removed from the pack either through the action of a static line attached to the airplane or through the action of a removal chute released by a release cord or rip-cord. A pilot chute is released thereby, and acts to withdraw the main parachute from the pack. The disposition of the parachute in the pack is such that it may be almost if not quite fully elongated before it is completely withdrawn. The casing, as has been indicated, is an elongated casing and permits this action. Under the influence of the pilot chute, the main parachute is fully elongated and withdrawn from the casing in relatively still air. When the weight of the user overcomes the sustaining effect of the pilot chute, the main parachute is subjected to a slip stream of air which distends it, but this cannot occur until the main parachute has been fully withdrawn and elongated, as will now be evident.

Referring to Figures 1, 2 and 3, the casing for my pack has an imperforate front member 1, a top closure member 2, side members 3 and 4 and a back portion hereinafter described. The member 2 is a top member when the pack is worn by the airman, but as pointed out above, the closure member 26 will be at the top when the pack is in position above the user, as in a jump. The casing is made preferably of flexible water-proof material. The side members 3 and 4 are of generally rectangular shape to enable the pack to assume the position shown in Figure 3 when the user is seated. In the regions 3a and 4a these portions are slightly wider, whereby the seat portion is somewhat thicker than the back portion. Since this region is adjacent the open end of the casing, withdrawal of the parachute is facilitated. The back portion of the pack is made openable for cleaning and repacking. Preferably it is formed of parts 5, 6 and 7, the parts 5 and 6 being joined by a zipper 8 and the parts 5 and 6 being joined respectively to part 7 by zippers 9 and 10. The zippers are preferably of the separable variety so that the parts forming the back may be laid entirely open. The parachute straps 11, 12, 13 and 14 enter the pack and may be fastened thereto as at 15. Continuations of these straps will be understood as attached to a parachute harness or provided with fastenings for that purpose as clearly shown in Figure 5.

In Figure 5 I have shown the dispostion of the parachute in the pack. The parachute cords, some of which are indicated collectively at 16 are attached to the usual rings 17 on the ends of the parachute straps. These cords are taken up in zigzag formation and are held by the usual elastic bands 18 or other suitable fastening means to the front panel 1 of the casing in such manner that they can easily be disengaged. The folding of the parachute is commenced with the bottom portion of the parachute (i. e. the edges to which the cords are attached) fouled toward the top or closed end of the casing and then back upon itself as at 19. The bottom edge of the parachute being the most voluminous part of it fills out the casing at this point, compensating for the thickness of the cords, disposed as shown. The folding of the parachute is then continued toward the bottom or open end of the casing, a portion of the parachute covering the cords as at 20 and other portions being reversely folded as at 21 to pad out the seat portion of the casing. The extreme top of the parachute as at 22 is located adjacent the open end of the casing where it is attached to a pilot chute indicated at 23. The parachute is thus in a position to be withdrawn from the casing through the open end thereof in a progressive manner, i. e. top foremost. The parachute is not released in a folded mass as in many packs but instead must be progressively drawn out and extended; and the extension of the parachute occurs prior to the releasing of the parachute cords. Indeed, the bottom end or skirt portion of the parachute is the last portion to leave the casing, the remainder of the parachute being first fully extended. Then the cords are released. As I have explained, the subjecting of the parachute to a stream of air capable of inflating it does not occur until the parachute and its cords are fully extended and the weight of the falling user begins to overcome the lift power of the pilot chute. At 17a I have shown steering lines fastened to the rings 17. These hang down in use to a position where they may be conveniently grasped by the jumper.

As indicated, the packing of the parachute in the casing is done loosely and not under heavy compressive pressure.

As in Figure 6, I may make the back portion of my casing with over-width flaps 5a and 6a capable, after the parachute has been packed, of forming a fold as indicated at 24, which fold can be held over on the body of the casing by means of fasteners 25. The members 25 may be conical metallic elements fastened to the panel 6, and arranged to cooperate with aligned grommets 5b and 6b in the flaps 5a and 6a. The members 25 are perforated near their ends to accept locking pins 25a which serve to maintain the grommets 5b and 6b in position. The pins 25a are attached at appropriately spaced points to a pull tape or line 25b which is itself attached to the cords of the pilot chute as clearly shown in Figure 7. When the pilot chute starts to pull the main chute out of the pack, the several pins 25a will be pulled out, releasing the grommets 5b and 6b and causing the casing to expand so that the main chute may be pulled out more readily. The use of over-width flaps as described is also of value where the same casing is to be used at different times for the packing of larger or smaller parachutes since its internal volume can thus be adjusted. Of course if a chute is picked which fills the casing with the flaps open, the pins 25a and 25b will be omitted.

The casing is completed by a cap-like hood of open ended box shape designed to fit over the open end of the casing. It comprises a front panel 26, a back panel 27, and a side and end closure strip 28. It is designed to be held to the casing by a suitable releasable fastening means. I may employ for this purpose snap fasteners. A cord 29 (which may be the static line from an airplane) enters and leaves the hood through an opening shown at 30 in Figure 1. The intermediate bulk of the cord is looped or collected within the hood as at 31 in Figure 4 where the loops are held by suitable elastic bands or the like 32. An interior flap 33 may be provided within the hood to keep the loops from contact with other flexible flaps may be held in closed position by means of snap fasteners such as are indicated at 34.

I have shown the end of the static line attached as at 35 to a second cord or tape 36, which enters beneath the hood panels 26 and 27 as shown. There it is joined as at 37 to a plurality of branch cords or tapes 36a going to various snap fastener heads on a sub-panel 26a underlying panel 26 and on the panel 27. It will be noted in Figure 2 that I carry these tapes 36a over and beneath the heads of snap fasteners 38 coacting with fastener bases 39 on the rear flaps of the parachute casing. The result of this construction is to cause the tapes 36a to exert upon the fastener heads 38 both a lifting and a tilting motion to insure the separation of the fasteners.

As another feature of the construction of the hood, I prefer to provide within it a free ended flap 40 of considerable length. The pilot chute 22, as shown in Figures 5, 8a and 9, is rolled in this flap so that when the hood is removed from the casing, the pilot chute will first be unrolled and distended so as to withdraw the main parachute, as explained above.

Considering the cord or tape 29 to be a static line attached to an airplane, it will be evident that when the user jumps the looped portions of the line 29 first come out of the hood to permit the user to fall clear of the airplane itself. When the static line 29 has been fully withdrawn, it then acts through the cord or tape 36 to release the fasteners and pull the hood from the casing. As the hood is thus removed the pilot chute is likewise withdrawn and extended as has been described. The hood in this instance stays with the static line. The casing, now open at its end, will have assumed an upward position, as indicated in Figure 7 and as previously described. In that figure 41 indicates cords to the pilot chute (not shown); and the main chute is beginning to be withdrawn top first from the casing as at 42. The user will be falling below the casing, as has already been pointed out.

Where the parachute is not to be operated by a static line but rather by a rip-cord under the control of the user, various means may be employed to bring about the release of a pilot chute. One of these means comprises a small removal chute, the purpose of which is to pull the hood from the casing. In Figures 8 to 10 inclusive I have shown an over-flap 43 attached to one of the panels 26 or 27 of the hood. This over-flap forms with adjacent parts of the hood a sort of pocket in which a removal chute shown at 44 in Figure 9 may be fastened externally of the hood.

The overflap is provided with large grommets 43a; and in packing, the overflap 43 is reversely folded and the grommets 43a are passed over the male elements 38 of the snap fasteners which hold the hood in place. Thus, when the female elements 38 of the snap fasteners are secured, they hold the overflap 43 in position. A rip cord is provided at 46 for releasing the overflap so that the removal chute can become operative. As shown in Figure 11 one release means comprises a metal fitting 49 riveted or otherwise attached to the tape 43, and perforated as at 50 so that the two parts of the snap fastener can be snapped together through the perforation. The fitting in the perforated area has an inclined portion 51 and an end 52 therebeyond, which end is effectively thickened as by rolling the metal as shown. When a snap fastener is snapped together through the perforation 50, the result of a longitudinal pull on the tape 48 is to apply not only a separating force but a tilting force to the fastener parts, as will be evident.

The rip-cord will be brought to a position of convenient access to the user of the parachute and for this purpose may be slidably housed in tape guides 53 on the casing and, if desired, also on the parachute harness. When the parachute user pulls the rip-cord the over-flap 43 is freed and the removal chute released, and the side of the hood 26 under the flap 43 is also released. The removal chute is attached to a short cord 29a responding to cord or tape 29 and acting as has hereinabove been set forth to release the fasteners which hold the hood to the other side of the casing. As the user falls, the hood is carried away from the casing and the pilot chute 23 is released from the flap 40 as has already been described. The hood and its removal chute may be freed entirely from the remainder of my structure by permitting the rip-cord 46 to slide through the guide sleeve 53 or by arranging the strength of the rip-cord so that it will break after the removal of the hood.

It will be clear that when the pack is arranged as above described, a static line may still be employed as indicated at 29 in Figure 8a. If the static line is used, it will be clear from a consideration of this figure, that the tapes 36a will release the snap fasteners as heretofore described, whereupon the hood will be pulled off and the flap 43 will also be forced. The removal chute in this instance performs no useful function. When the static line is not used, the removal chute is necessary to the removal of the hood.

Modifications may be made in my invention without departing from the spirit of it. For example, the casing may be closed at its open end by removable means other than the hood which I have specifically described and various means may be employed to open such a closure, such means being preferably ones which will insure the freeing and opening of the pilot chute. An advantage of the hood construction is not only that it effectively closes the open end of the casing against rain, dust and dirt, but also when removed, leaves the casing end in a widely open condition and without obstructions which might interfere with the withdrawal of the parachute. It may be noted that in my preferred construction my casing is thicker at the open end than at the closed end, thus making it very easy to withdraw the main parachute and eliminating frictional resistance.

Having thus described my invention in certain exemplary embodiments, what I claim as new and desire to secure by Letters Patent is:

1. In a parachute pack construction, a casing of elongated form closed at one end and open at the other, said casing adapted to contain a parachute with which a pilot chute is associated, and attachable to parachute straps whereby it and the parachute may be attached to a parachute harness, means for closing the open end of said casing, said casing adapted to trail above the head of a parachute user during his initial descent and control his fall, and controllable means for opening said closure and releasing said pilot chute whereby the pilot chute is enabled to withdraw said parachute from said casing and elongate it prior to the distension of said parachute.

2. The structure claimed in claim 1 wherein said elongated casing is of sufficient length when located on the back of the parachute user to provide both a back rest and a seat portion.

3. The structure claimed in claim 1 wherein said elongated casing is of sufficient length when located on the back of the parachute used to provide both a back rest and a seat portion, and wherein said means for closing said casing is a hood portion covering the open end thereof, releasable means for attaching said hood to said casing, an interior flap fastened to said hood with which said pilot chute may be associated by rolling so that the removal of said hood results in the release and unrolling of said pilot chute prior to the withdrawal of said parachute from said casing.

4. The structure claimed in claim 1 wherein said elongated casing is of sufficient length when located on the back of the parachute user to provide both a back rest and a seat portion, and wherein said means for closing said casing is a hood portion covering the open end thereof, releasable means for attaching said hood to said casing, an interior flap fastened to said hood with which said pilot chute may be associated by rolling so that the removal of said hood results in the release and unrolling of said pilot chute prior to the withdrawal of said parachute from said casing, a cord associated with said hood and operatively connected with the said releasable fastening means therefor.

5. The structure claimed in claim 1 wherein said elongated casing is of sufficient length when located on the back of the parachute user to provide both a back rest and a seat portion, and wherein said means for closing said casing is a hood portion covering the open end thereof, releasable means for attaching said hood to said casing, an interior flap fastened to said hood with which said pilot chute may be associated by rolling so that the removal of said hood results in the release and unrolling of said pilot chute prior to the withdrawal of said parachute from said casing, a cord associated with said hood and operatively connected with the said releasable fastening means therefor whereby a pull on said cord resulting in positive removal of said hood, said cord being a static line, a substantial length of said static line contained within said hood and withdrawable therefrom prior to the removal of said hood, said cord length located in said hood beneath an interior flap therein.

6. In a parachute pack construction, an elongated casing comprising front and back panel forming members, an end closure member and side closure members of substantially rectangular formation, said casing adapted to contain a folded parachute, straps associated with said casing and by means of which it and the parachute may be attached to a parachute harness near shoulder portions thereof, said casing positioned to hang downwardly over the back of the parachute user, said casing being flexible so as to bend to provide a back rest and seat for the user.

7. In a parachute pack construction, an elongated casing comprising front and back panel forming members, an end closure member and side closure members of substantially rectangular formation, said casing adapted to contain a folded parachute, straps associated with said casing and by means of which it and the parachute may be attached to a parachute harness near shoulder portions thereof, said casing positioned to hang downwardly over the back of the parachute user, said casing being flexible so as to bend to provide a back rest and seat for the user, said casing being thicker in the seat portion than in the said back portion, an open end in said casing at the edge of said seat portion, the increasing thickness of said casing toward said open end facilitating removal of a parachute packed therein.

8. In a parachute pack construction, an elongated casing comprising front and back panel forming members, an end closure member and side closure members of substantially rectangular formation, said casing adapted to contain a folded parachute, straps associated with said casing by means of which it and the parachute may be attached to a parachute harness near shoulder portions thereof, said casing positioned to hang downwardly over the back of the parachute user, said casing being flexible so as to bend to provide a back rest and seat for the user, said casing being thicker in the seat portion than in the said back portion, an open end in said casing at the edge of said seat portion, the increasing thickness of said casing toward said open end facilitating removal of a parachute packed therein, one of said panel forming members divided into flaps with releasable fastening means joining the edges of said flaps, said flaps operable to open up said casing substantially throughout its length for the packing of a parachute therein.

9. In a parachute pack construction, an elongated casing comprising front and back panel forming members, an end closure member and side closure members of substantially rectangular formation, said casing adapted to contain a folded parachute, straps associated with said casing by means of which it and the parachute may be attached to a parachute harness near shoulder portions thereof, said casing positioned to hang downwardly over the back of the parachute user, said casing being flexible so as to bend to provide a back rest and seat for the user, said casing being thicker in the seat portion than in the said back portion, an open end in said casing at the edge of said seat portion, the increasing thickness of said casing toward said open end facilitating removal of a parachute packed therein, one of said panel forming members divided into flaps with releasable fastening means joining the edges of said flaps, said flaps operable to open up said casing substantially throughout its length for the packing of a parachute therein, in combination with a hood member adapted to pass over the open end of said casing and releasable means for fastening said hood to said casing.

10. In a parachute pack construction, an elongated casing comprising front and back panel forming members, an end closure member and side closure members of substantially rectangular formation, said casing adapted to contain a folded parachute, straps associated with said casing by means of which it and the parachute may be attached to a parachute harness near shoulder portions thereof, said casing positioned to hang downwardly over the back of the parachute user, said casing being flexible so as to bend to provide a back rest and seat for the user, said casing being thicker in the seat portion than in the said back portion, an open end in said casing at the edge of said seat portion, the increasing thickness of said casing toward said open end facilitating removal of a parachute packed therein, one of said panel forming members divided into flaps with releasable fastening means joining the edges of said flaps, said flaps operable to open up said casing substantially throughout its length for the packing of a parachute therein, in combination with a hood member adapted to pass over the open end of said casing and releasable means for fastening said hood to said casing, a side panel secured to said hood and an inner flap spaced therefrom, snap fastener parts on said inner flap, said fasteners cooperating with snap fastener parts on said casing, and a removal line passing between said panel and said flap, portions of said removal line associated with certain of said snap fastener parts by passing over and then beneath them whereby a pull on said cord will exert a lifting and tilting force on said snap fastener parts to release them.

11. In a parachute pack construction, an elongated casing comprising front and back panel forming members, an end closure member and side closure members of substantially rectangular formation, said casing adapted to contain a folded parachute, straps associated with said casing by means of which it and the parachute may be attached to a parachute harness near shoulder portions thereof, said casing positioned to hang downwardly over the back of the parachute user, said casing being flexible so as to bend to provide a back rest and seat for the user, said casing being thicker in the seat portion than in the said back portion, an open end in said casing at the edge of said seat portion, the increasing thickness of said casing toward said open end facilitating removal of a parachute packed therein, one of said panel forming members divided into flaps with releasable fastening means joining the edges of said flaps, said flaps operable to open up said casing substantially throughout its length for the packing of a parachute therein, in combination with a hood member adapted to pass over the open end of said casing and releasable means for fastening said hood to said casing, a side panel secured to said hood and an inner flap spaced therefrom, snap fastener parts on said inner flap, said fasteners cooperating with snap fastener parts on said casing, a removal line passing between said panel and said flap, portions of said removal line associated with certain of said snap fastener parts by passing over and then beneath them whereby a pull on said cord will exert a lifting and tilting force on said snap fastener parts to release them, and an interior free ended flap secured to said hood for association with a pilot chute.

12. In a parachute pack construction, an elongated casing comprising front and back panel forming members, an end closure member and side closure members of substantially rectangular formation, said casing adapted to contain a folded parachute, straps associated with said casing by means of which it and the parachute may be attached to a parachute harness near shoulder portions thereof, said casing positioned to hang downwardly over the back of the parachute user, said casing being flexible so as to bend to provide a back rest and seat for the user, said casing being thicker in the seat portion than in the said back portion, an open end in said casing at the edge of said seat portion, the increasing thickness of said casing toward said open end facilitating removal of a parachute packed therein, one of said panel forming members divided into flaps with releasable fastening means joining the edges of said flaps, said flaps operable to open up said casing substantially throughout its length for the packing of a parachute therein, in combination with a hood member adapted to pass over the open end of said casing and releasable means for fastening said hood to said casing, a side panel secured to said hood and an inner flap spaced therefrom, snap fastener parts on said inner flap, said fasteners cooperating with snap fastener parts on said casing, a removal line passing between said panel and said flap, portions of said removal line associated with certain of said snap fastener parts by passing over and then beneath them whereby a pull on said cord will exert a lifting and tilting force on said snap fastener parts to release them, and an interior free ended flap secured to said hood for association with a pilot chute, and a slack portion in said cord accumulated releasably beneath a panel of said hood and protected therein by an interior flap.

13. In a parachute pack construction, an elongated casing comprising front and back panel forming members, an end closure member and side closure members of substantially rectangular formation, said casing adapted to contain a folded parachute, straps associated with said casing by means of which it and the parachute may be attached to a parachute harness near shoulder portions thereof, said casing positioned to hang downwardly over the back of the parachute user, said casing being flexible so as to bend to provide a back rest and seat for the user, said casing being thicker in the seat portion than in the said back portion, an open end in said casing at the edge of said seat portion, the increasing thickness of said casing toward said open end facilitating removal of a parachute packed therein, one of said panel forming members divided into flaps with releasable fastening means joining the edges of said flaps, said flaps operable to open up said casing substantially throughout its length for the packing of a parachute therein, in combination with a hood member adapted to pass over the open end of said casing and releasable means for fastening said hood to said casing, a side panel secured to said hood and an inner flap spaced therefrom, snap fastener parts on said inner flap, said fasteners cooperating with snap fastener parts on said casing, a removal line passing between said panel and said flap, portions of said removal line associated with certain of said snap fastener parts by passing over and then beneath them whereby a pull on said cord will exert a lifting and tilting force on said snap fastener parts to release them, and an interior free ended flap secured to said hood for association with a pilot chute, an over-flap associated with one of the panels of said hood and forming therewith a pocket in which a removal chute is located, releasable fastening means for said over-flap and a second cord associated therewith in such manner as to release said fastening means, said pilot chute attached to said first mentioned cord whereby a pull exerted by said removal chute will result in freeing and removal of said hood.

14. In a parachute pack construction, an elongated casing comprising front and back panel forming members, an end closure member and side closure members of substantially rectangular formation, said casing adapted to contain a folded parachute, straps associated with said casing by means of which it and the parachute may be attached to a parachute harness near shoulder portions thereof, said casing positioned to hang downwardly over the back of the parachute user, said casing being flexible so as to bend to provide a back rest and seat for the user, said casing being thicker in the seat portion than in the said back portion, an open end in said casing at the edge of said seat portion, the increasing thickness of said casing toward said open end facilitating removal of a parachute packed therein, one of said panel forming members divided into flaps with releasable fastening means joining the edges of said flaps, said flaps operable to open up said casing substantially throughout its length for the packing of a parachute therein, said flaps being wider than half the width of said panel forming member whereby to produce slackness which may be gathered in a fold, and releasable fastening means to hold said fold closed.

15. In a parachute pack, an elongated casing closed at one end and made of flexible material, a parachute, straps associated with said parachute and the closed end of said casing, cords associated with said straps, said cords accumulated by doubling and releasably fastened to said casing, interiorly thereof and intermediate the ends of said casing, said parachute loosely packed in said casing in such manner that the skirt of said parachute is located adjacent the closed end of said casing, said parachute folded intermediate the ends of said casing, said folds disposed so that the top end of said parachute lies adjacent the open end of said casing, said parachute withdrawable from said casing progressively in such manner that the withdrawal of both parachute and cords may be accomplished prior to the exertion of a substantial downward pull on said parachute through said straps, said casing sufficiently long to form both a back portion and a seat portion and bendable to relate said portions angularly to each other.

16. In a parachute pack, an elongated casing closed at one end and made of flexible material, a parachute, straps associated with said parachute and the closed end of said casing, cords associated with said straps, said cords accumulated by doubling and releasably fastened to said casing, interiorly thereof and intermediate the ends of said casing, said parachute loosely packed in said casing in such manner that the skirt of said parachute is located adjacent the closed end of said casing, said parachute folded intermediate the ends of said casing, said folds disposed so that the top end of said parachute lies adjacent the open end of said casing, said parachute withdrawable from said casing progressively in such manner that the withdrawal of both parachute and cords may be accomplished prior to the exertion of a substantial downward pull on said parachute through said straps, said casing sufficiently long to form both a back portion and a seat portion and bendable to relate said portions angularly to each other, in combination with a hood passed over the open end of said casing and releasably associated therewith, a pilot chute associated with said parachute, and means for releasably associating said pilot chute with said hood whereby removal of said hood results in removal and release of said pilot chute.

17. The structure claimed in claim 1, including steering lines attached to said parachute straps and positioned to hang down within easy reach of the user.

18. In a parachute pack construction comprising an elongated casing open at one end, said open end closed by a hood releasably fastened thereto, said casing adapted to contain a parachute and a pilot chute, a static line, means for releasing said releasable fastenings in response to tension on said static line, said hood provided with an overflap having enlarged openings along its free edge, the free edge of said overflap turned under and fastened under an edge of said hood with said openings engaging said releasable fastenings, a rip cord, and means to release said fastenings in response to tension on said rip cord, and a removal chute arranged within said overflap and attached to said hood to remove the same, said tension responsive means alternatively operable without interference with each other.

19. A device according to claim 18, in which said releasable fastenings comprise snap fasteners, and in which the openings along the free edge of the overflap are engaged around said snap fasteners, said means to release said fastenings comprising apertured members engaged between the elements of said snap fasteners and provided with cam surfaces, whereby a pull on said rip cord positively forces the elements of said snap fasteners apart.

CARL L. NOELCKE, Sr.

REFERENCES CITED

The following references are of record in the file of this patent:

UNITED STATES PATENTS

| Number | Name | Date |
|---|---|---|
| 1,260,474 | Stevens | Mar. 26, 1918 |
| 1,838,970 | Trican | Dec. 29, 1931 |
| 1,909,158 | Albihn | May 16, 1933 |
| 2,149,540 | Muller | Mar. 7, 1939 |
| 2,384,651 | Smith | Sept. 11, 1945 |

FOREIGN PATENTS

| Number | Country | Date |
|---|---|---|
| 458,281 | Great Britain | Dec. 16, 1936 |
| 538,414 | France | Mar. 18, 1922 |